United States Patent [19]
Tuszko et al.

[11] Patent Number: 6,071,424
[45] Date of Patent: Jun. 6, 2000

[54] ALTERNATIVE UNIVERSAL LONG FREE VORTEX CYLINDRICAL CYCLONE METHOD

[76] Inventors: Wlodzimierz J. Tuszko, 5434 Camino De Ville, Camarillo, Calif. 93012; Wojciech Tuszko, 918 4th St., Apt. 2, Santa Monica, Calif. 90403

[21] Appl. No.: 09/378,289

[22] Filed: Apr. 4, 1998

Related U.S. Application Data

[63] Continuation-in-part of application No. 08/876,623, Jun. 14, 1997, abandoned, which is a continuation of application No. 08/674,407, Jul. 2, 1996, abandoned, which is a division of application No. 08/494,837, Jun. 26, 1995, abandoned.

[51] Int. Cl.$^7$ .......................... B01D 21/26; B01D 17/038
[52] U.S. Cl. ........................ 210/788; 210/787; 210/512.1; 209/715; 209/727; 55/459.1
[58] Field of Search .................................. 210/787, 788, 210/221.2, 512.1; 209/715, 727; 55/459.1

[56] References Cited

U.S. PATENT DOCUMENTS 5,269,949  12/1993  Tuszko et al. ...................... 210/788

*Primary Examiner*—David A. Reifsnyder

[57] ABSTRACT

A method of using a hydrocyclone utilizing a Alternative Universal Long Free Vortex central inner vortex be. The invented hydrocyclone has a significantly reduced diameter and about two times the separation capacity of a conventional hydrocyclone of approximately the same height. The invented hydrocyclone can be operated under neutral pressure, positive pressure or negative pressure.

3 Claims, 4 Drawing Sheets

A-B

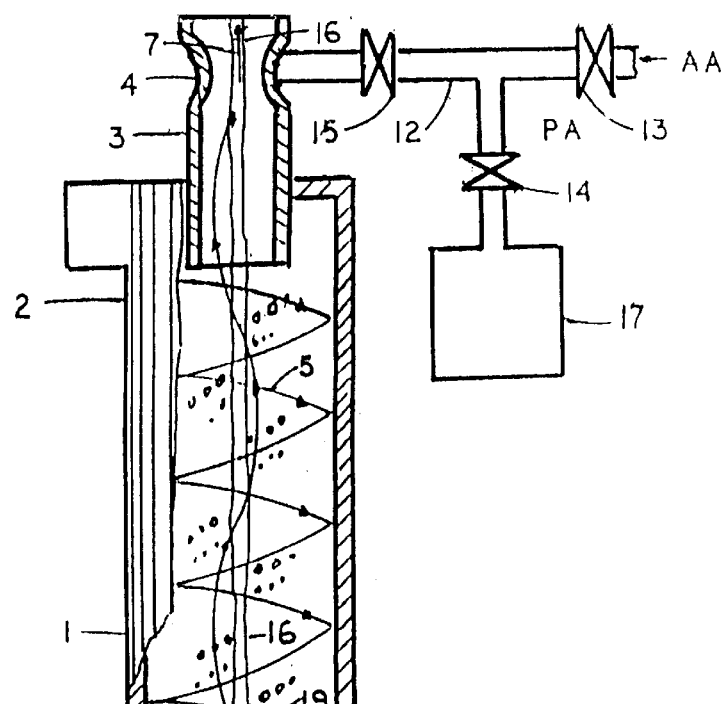
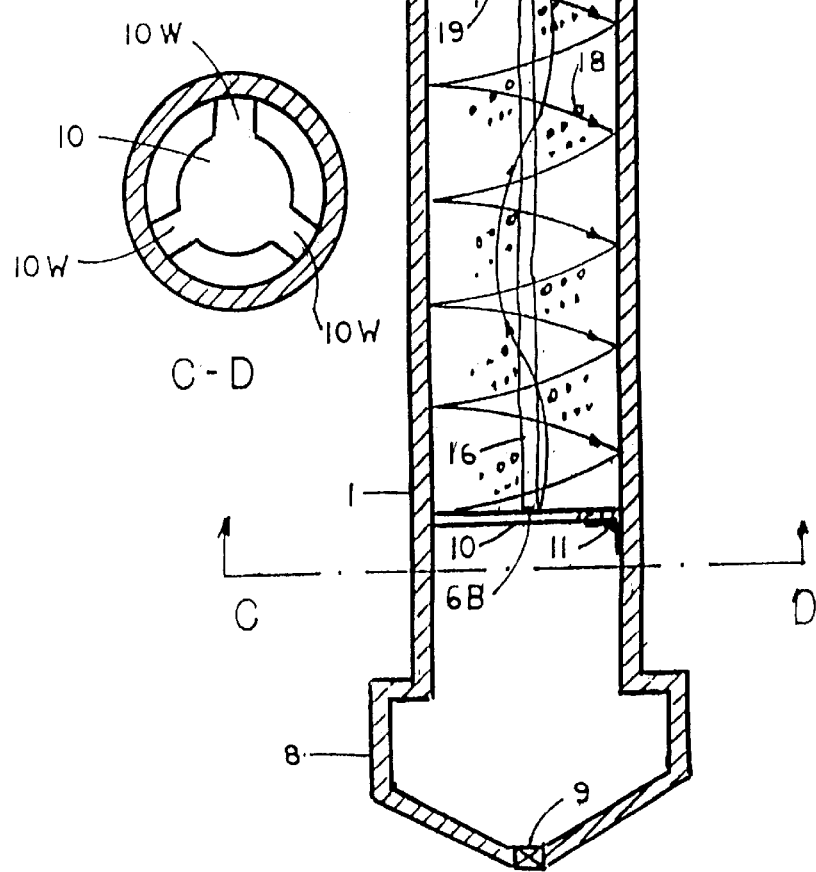
FIG. 3
FIG. 4

ALTERNATIVE UNIVERSAL LONG FREE VORTEX CYLINDRICAL CYCLONE METHOD

This application is a continuation-in-part of U.S. application Ser. No. 08/876,623 filed on Jun. 14, 1997, now abandoned, which is a continuation of U.S. application Ser. No. 08/674,407 filed on Jul. 2, 1996, now abandoned, which is a division of U.S. application Ser. No. 08/494,837 filed on Jun. 26, 1995, now abandoned.

FIELD OF THE INVENTION

This invention relates to a method and apparatus for continuous separation of solid-solid, solid-liquid, liquid-liquid liquid suspension of particulate material or mixture liquid-liquid. More specifically, the invention is directed to considerably increasing capacity and separation efficiency as well as to reduce pressure drop for all kinds of hydrocyclone outflow operations.

BACKGROUND

An early hydrocyclone method and apparatus from U.S. Pat. No. 453,105 (Bretney) issued May 28, 1891 in which there are two stages, in line, in the separating hydrocyclone. A frequent problem with this and later hydrocyclone devices are—so called "back mix," high pressure drop and fast erosion of the conical portion.

A hydrocyclone is a device for creation of a free vortex, and it is the vortex that does the work in separating the particle matter from liquid.

The new features of the hydrocyclone air core as the vortex driving force, was discovered and used to greatly improve the hydrocyclone collectors (Wlodzimierz J. Tuszko and all U.S. Pat. No. 4,927,298 issued May 22, 1990, U.S. Pat. No. 5,269,949 issued Dec. 14, 1993, U.S. Pat. No. 5,273,647 issued Dec. 28, 1993, application Ser. No. 08/238,903 filing date May 6, 1994 now abandoned. Application Ser. No. 08/402,175 filing date Mar. 10, 1955 now abandoned).

It is therefore one object of the present invention to greatly increase the free vortex length for pressurizing, vacuumizing, and vent outflow operations.

Further object of the present invention is to reduce significantly diameter as well as to increase capacity of Alternative Universal Long Free Vortex hydrocyclone compared to conventional, conical (CC) hydrocyclone of the same height.

Still another object of the present invention is that different technical means to increase separation efficiency could be used for the same Alternative hydrocyclone depending on needs and financial limits.

SUMMARY OF THE INVENTION

This invention relates to a device for separating of particulate liquid suspension known as a hydrocyclone, in which centrifugal forces of the revolving particulate suspension cause separation of the suspension into finer and coarser or light and denser fractions. The conventional of the conical predominating shape, hydrocyclone are features of high pressure drop and energy consumption to get a high separation efficiency. This conical cyclone portion participates in creating so-called "back mix" and it is vulnerable to be fast eroded.

To avoid those harmful phenomenons and to make the hydrocyclone to be easily adjusted for every kind of operation and need, the present invention provides in the separation chamber of Alternative hydrocyclone, the central inner vortex bed with or without artificial air core to create free vortex throughout the separation chamber.

BRIEF DESCRIPTION OF THE DRAWING

FIG. 3 is a view of the Invented Alternative Universal Long Free Vortex hydrocyclone having a completely cylindrical separation chamber with an air core anchored to a central inner vortex bed.

FIG. 4 is a cross-sectional view of FIG. 3.

DETAILED DESCRIPTION OF THE INVENTION

Figure 1:
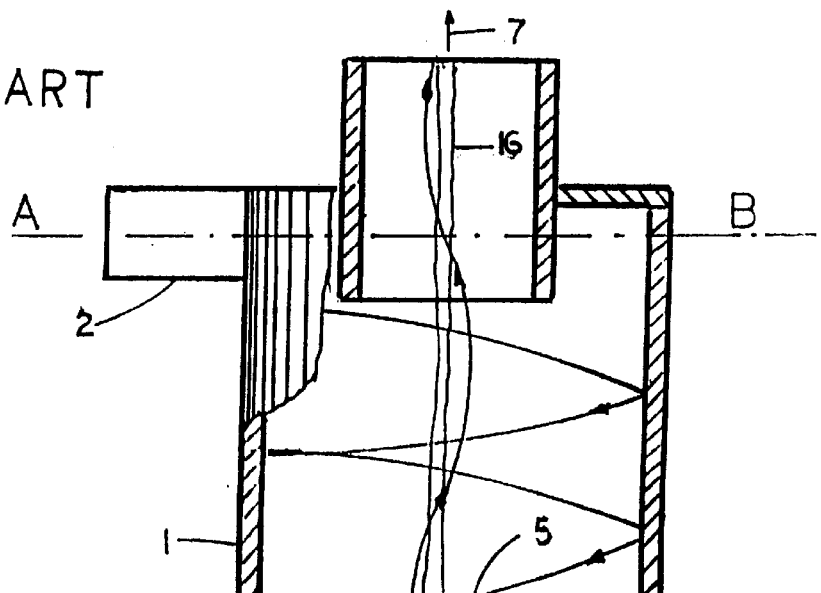
FIG. 1 is a view of a conventional hydrocyclone having a cylindrical-conical separation chamber.
Figure 2:
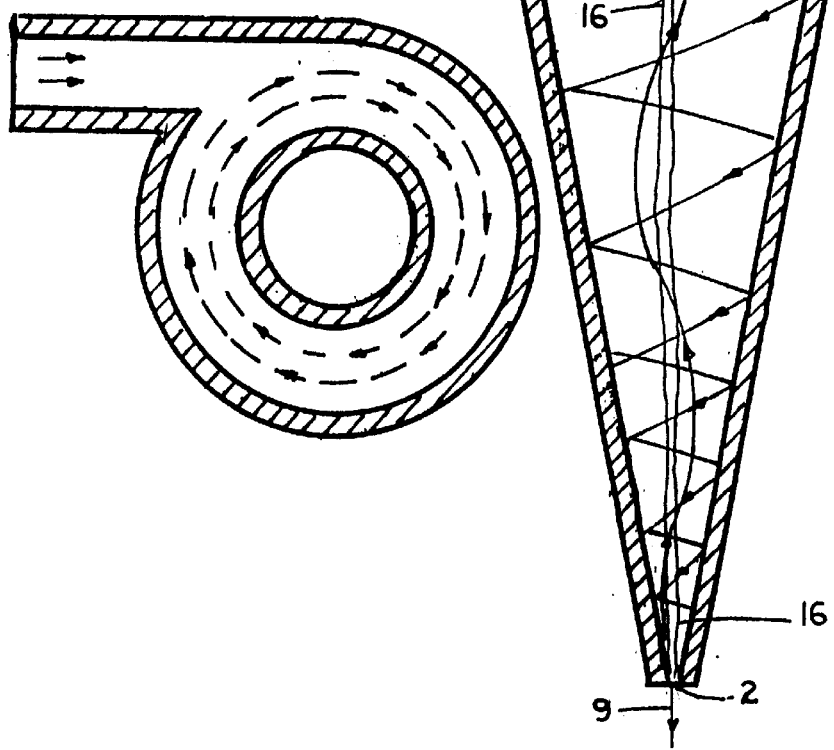
FIG. 2 is a cross-sectional view of FIG. 1.

A conventional conical hydrocyclone for separating of fluid mixtures which are centrifugally separable is illustrated in FIG. 1 and FIG. 2. This hydrocyclone is comprised of short cylindrical portion 1 having an inlet duct, 2 for introduction of a feed suspension or feed mixture in tangential direction. An exhaust or overflow pipe 3 extends through the top or ceiling wall of the cylindrical portion 1. A frustum-conical portion 4 is axially aligned with the exhaust pipe 3. In the portion 1 and 4 together as in separating chamber the feed suspension or feed mixture flows in the helical swirling flow pattern so to establish counter-flowing outer 5 and inner 6 vortexes within the separating chamber, inherently causing solids in the fluid flow, which are smaller or lighter to move to the inner vortex 6 and exist through overflow pipe 3 as a smaller or lighter product stream or overflow 7. Ingredients in the fluid flow which are coarser or heavier move to the outer vortex 5 and exit through the outlet 8 as a coarser or heavier product stream or as underflow 9. Along the central hydrocyclone vertical axis the air core 16 is created, that extends from underflow outlet 8 throughout all long conical portions 4, cylindrical portion 1, and finally through the exhaust pipe 3. This air core 16 is created from atmospheric air that is sucked through underflow outlet 8 and exhausted with overflow stream 7. The lower the level of the cylindrical portion the smaller the circular velocity of the outer vortex 5. That is why in conventional conical (CC) hydrocyclone, the outer conical portion 4 is used to accelerate the outer vortex 5 and later to animate the inner vortex 4 with air core 16.

The Invented Alternative Universal Long Free Vortex hydrocyclone having a completely cylindrical separation chamber with an air core anchored to a central inner vortex bed, the air core being created with or without a steady supply of air is illustrated in FIG. 3. The hydrocyclone of FIG. 3 is composed of a long cylindrical separation chamber 1 whose length is approximately five times the diameter of the hydrocyclone, compared to a conventional hydrocyclone which has a cylindrical separation chamber whose length is approximately 1.3 times the diameter of the hydrocyclone. The hydrocyclone of FIG. 3 includes a underflow collection chamber 8 having an upper end contiguous with the long cylindrical separation chamber and an underflow discharge valve at the lower end of the underflow collection chamber 8. In FIG. 3 a inner vortex bed 10 of metal, plastic, rubber or other material is placed coaxially in the bottom of the cylindrical separation chamber 1: said bed 10 is shaped flatly, conically, or with another form, and it's wings 10W are attached to support elements 11 on the hydrocyclone's walls. The exemplary shape of the inner vortex bed 10 is shown in FIG. 4. The invented method presents two alternative types of its technology—the first one with steady supply of atmospheric air into the cyclone, to create gas core 16 and second one without any steady supply of atmospheric air to create gas core 16. In the first alternative the gas duct 12 with valves 13 and 14 and control valve 15 is connected to exhaust pipe 3. For low hydrocyclone overflow back pressure or for one, the valve 14 is closed and atmospheric air (AA) is introduced through valves 13 and 15 to the rotating fluid in exhaust pipe top portion 4 to create the artificial gas core. Said gas core 16 along with inner vortex 6 are extended in all long separation chambers and anchored with their base 6B on the inner vortex base 10. For higher hydrocyclone overflow back pressure the valve 13 is closed and the pressurized air (PA) from compressor 17 through valve 14 is introduced to exhaust pipe top portion 4. The gas inflow control valve 15 is set according to the process requirements. In the second alternative, after the feed liquid capacity is increased about two times compared to the conventional conical cyclone. Then the gas cavities from air contained in the liquid or/and from liquid vapor, can create the stable gas core 16, without using any steady atmospheric air supply into cyclone. This gas, that builds the gas core 16 is of a mixture of both air bubbles residues and air dissolved in liquid, combined with a liquid vapor cavities. A flowing liquid features a constant sum of static and dynamic velocity pressures. The bigger is the velocity, the smaller is the static pressure. When circular velocity of liquid exceeds its critical value, the static pressure drops below the liquid evaporation pressure and vapor cavities are freed. This high circular velocity of liquid throughout the cylindrical separation chamber is achieved after inner vortex 6 reaches the inner vortex bed 10 in cylindrical separation chamber bottom portion, to be whole sucked with or anchored in it. Then all above mentioned components of gas mixture are freed from liquid to create inner vortex gas core 16 throughout the cylindrical separation chamber. The cyclone can operate without using any gas core 16 and then the inner vortex 6 base 6B is anchored on the bed 10. The selection between the gas core operations or without them depends on the processing conditions and economical requirements.

Figure 5:
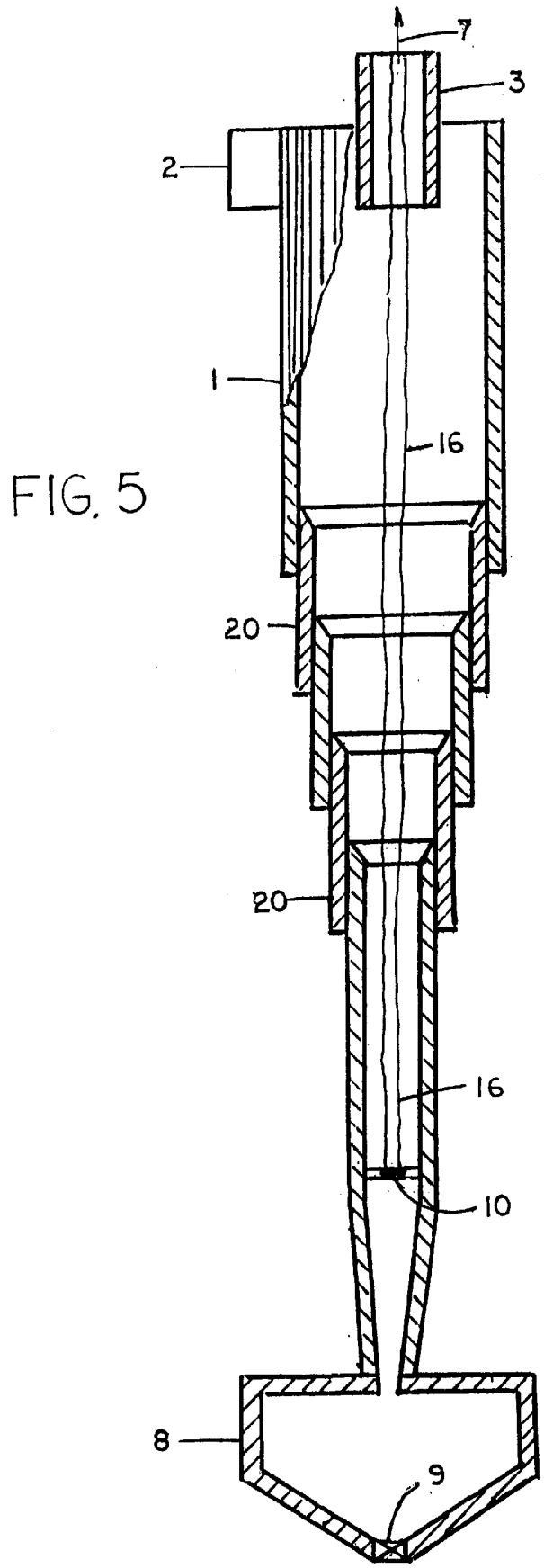
FIG. 5 is a view of the Invented Alternative Universal Long Free Vortex hydrocyclone having a separation chamber with an upper cylindrical portion and a lower telescopic portion with an air core anchored to a central inner vortex bed.

A second embodiment of the method of using the Invented Alternative Universal Long Free Vortex hydrocyclone with an inner vortex air core 16 anchored to a central inner vortex bed 10 as shown in FIG. 5. The inner vortex air core 16 of FIG. 5 is created without any steady supply of atmospheric air. The hydrocyclone of FIG. 5 comprises a separation chamber having an upper cylindrical portion 1 and a lower telescopic portion, the lower telescopic portion comprising a plurality if cylindrical tubings 20.

Figure 6:
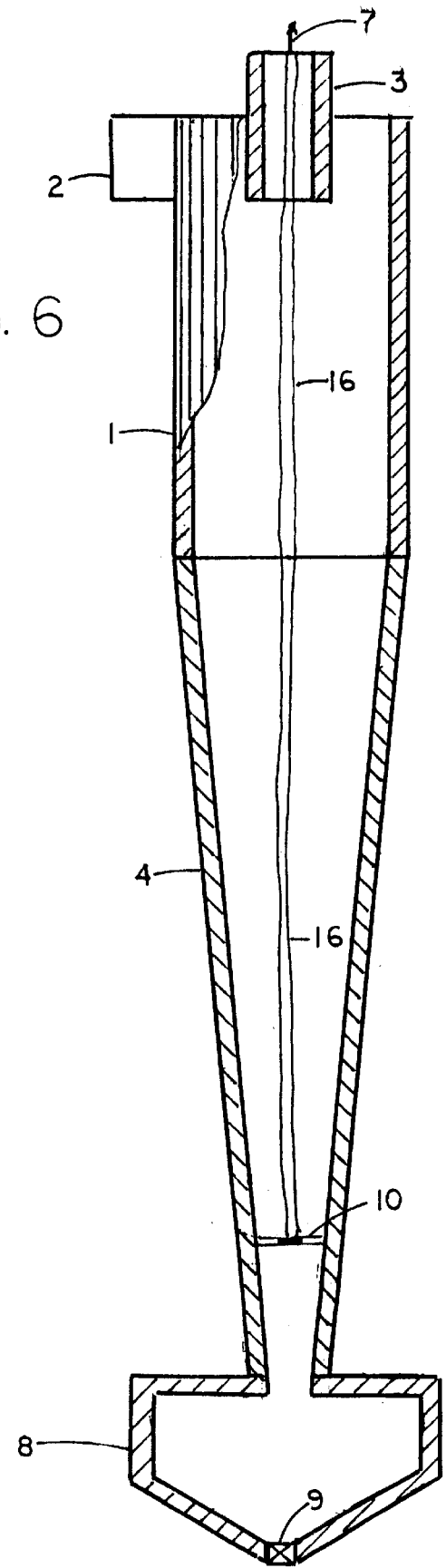
FIG. 6 is a view of the Invented Alternative Universal Long Free Vortex hydrocyclone having a separation chamber with an upper cylindrical portion and a lower conical portion with an air core anchored to a central inner vortex bed.

A third embodiment of the method of using the Invented Alternative Universal Long Free Vortex hydrocyclone with an inner vortex air core 16 anchored to a central inner vortex bed 10 as shown in FIG. 6. The inner vortex air core 16 of FIG. 6 is created without any steady supply of atmospheric air. The hydrocyclone of FIG. 6 comprises a separation chamber having an upper cylindrical portion 1 and a lower conical portion 4.

After investigation the use of Alternative Technology 1 and Alternative Technology 2 with a 2¼ inch diameter hydrocyclone in all of three embodiments, Alternative 2 was chosen to be claimed. The results of the quantitative separation tests has shown Alternative 2 Technology to be vastly superior to Alternative 1 Technology.

I claim:

1. In a method for separating a feed fluid comprising a liquid-liquid mixture or particulate suspensions of liquid mixtures delivered in fluid flow to a cyclone separator having an axially elongated cylindrical separation chamber, said separation chamber having an upper portion and a lower portion with a underflow product collector connected to said lower portion, said underflow product collector having a bottom outlet, said cylindrical separating chamber having an exhaust pipe having a bottom region disposed in said upper portion of said cylindrical separating chamber, and an inlet duct disposed in said upper portion of said cylindrical separating chamber for introducing said feed fluid in a tangential direction in a helical swirling flowing pattern so as to establish a circular velocity and counter-flowing inner and outer vortexes within the cylindrical separating chamber, a lighter portion of said feed fluid moves to the inner vortex and exits through the exhaust pipe as overflow and to a heavier portion of said feed fluid moves to the outer vortex and exits through the bottom outlet, as underflow, the improvement in the method comprising the steps of:

locating an inner gas core bed in the cylindrical separation chamber's lower portion without supplying a steady supply of gas, and increasing the introduction of said feed fluid so as to increase the liquid circular velocity over its critical value so as to originate gas cavities from air contained in the liquid to create a inner vortex gas core.

2. In a method for separating a feed fluid comprising a liquid-liquid mixture or particulate suspensions of liquid mixtures delivered in fluid flow to a cyclone separator having an axially elongated cylindrical separation chamber, said separation chamber having an upper portion and a telescopic lower portion comprising a plurality of cylindrical tubings with a underflow product collector connected to said telescopic lower portion, said underflow product collector having a bottom outlet, said cylindrical separating chamber having an exhaust pipe having a bottom region disposed in said upper portion of said cylindrical separating chamber, and an inlet duct disposed in said upper portion of said cylindrical separating chamber for introducing said feed fluid in a tangential direction in a helical swirling flowing pattern so as to establish a circular velocity and counter-flowing inner and outer vortexes within the cylindrical separating chamber, a lighter portion of said feed fluid moves to the inner vortex and exits through the exhaust pipe as overflow and to a heavier portion of said feed fluid moves to the outer vortex and exits through the bottom outlet, as underflow, the improvement in the method comprising the steps of:

locating an inner gas core bed in the cylindrical separation chamber's telescopic lower portion comprising a plurality of cylindrical tubings without supplying a steady supply of gas, and increasing the introduction of said feed fluid so as to increase the liquid circular velocity over its critical value so as to originate gas cavities from air contained in the liquid to create a inner vortex gas core.

3. In a method for separating a feed fluid comprising a liquid-liquid mixture or particulate suspensions of liquid mixtures delivered in fluid flow to a cyclone separator having an axially elongated cylindrical-conical separation chamber, said separation chamber having a cylindrical upper portion and a conical lower portion with a underflow product collector connected to said conical lower portion, said underflow product collector having a bottom outlet, said cylindrical separating chamber having an exhaust pipe having a bottom region disposed in said upper portion of said cylindrical separating chamber, and an inlet duct disposed in said upper portion of said cylindrical separating chamber for introducing said feed fluid in a tangential direction in a helical swirling flowing pattern so as to establish a circular velocity and counter-flowing inner and outer vortexes within the cylindrical separating chamber, a lighter portion of said feed fluid moves to the inner vortex and exits through the exhaust pipe as overflow and to a heavier portion of said feed fluid moves to the outer vortex and exits through the bottom outlet, as underflow, the improvement in the method comprising the steps of:

locating an inner gas core bed in the separation chamber's conical lower portion without supplying a steady supply of gas, and increasing the introduction of said feed fluid so as to increase the liquid circular velocity over its critical value so as to originate gas cavities from air contained in the liquid to create a inner vortex gas core.

* * * * *